(12) United States Patent
Shachar et al.

(10) Patent No.: US 12,026,374 B2
(45) Date of Patent: Jul. 2, 2024

(54) MIGRATION OF DATA TO MAINTAIN DATA RESILIENCY

(71) Applicant: Dell Products L.P., Round Rock, TX (US)

(72) Inventors: Tomer Shachar, Beer-Sheva (IL); Arieh Don, Newton, MA (US); Maxim Balin, Gan Yavne (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/934,060

(22) Filed: Sep. 21, 2022

(65) Prior Publication Data

US 2024/0094909 A1  Mar. 21, 2024

(51) Int. Cl.
*G06F 3/06* (2006.01)
*G06F 11/30* (2006.01)

(52) U.S. Cl.
CPC .......... *G06F 3/0611* (2013.01); *G06F 3/0649* (2013.01); *G06F 3/0685* (2013.01); *G06F 11/3034* (2013.01)

(58) Field of Classification Search
CPC .... G06F 3/0611; G06F 3/0649; G06F 3/0685; G06F 11/3034
See application file for complete search history.

(56) References Cited

U.S. PATENT DOCUMENTS

| | | | | |
|---|---|---|---|---|
| 9,037,826 B1* | 5/2015 | Brooker | ................ | G06F 3/0689 711/167 |
| 9,372,637 B1* | 6/2016 | Alatorre | ................... | G06N 5/04 |
| 2017/0206015 A1* | 7/2017 | Zhuang | ................. | G06F 3/0685 |
| 2021/0318931 A1* | 10/2021 | Brennan | ................ | G06F 11/076 |
| 2023/0236755 A1* | 7/2023 | Kulkarni | ................. | G06F 3/067 711/114 |

OTHER PUBLICATIONS

Mohan, Vinod, "Availability vs Durability vs Reliability vs Resilience vs Fault Tolerance", Jul. 5, 2022, https://www.datacore.com/blog/availability-durability-reliability-resilience-fault-tolerance/ (Year: 2022).*

Núñez-Gaona, Marco Antonio, et al. "A dependable massive storage service for medical imaging." Journal of Digital Imaging 31 (2018): 628-639. (Year: 2018).*

* cited by examiner

*Primary Examiner* — Nicholas J Simonetti
(74) *Attorney, Agent, or Firm* — McDermott Will & Emery LLP

(57) ABSTRACT

Migration of data to maintain data resiliency, including receiving user-input indicating a first data resiliency of first data; storing the first data at a first storage device of the storage devices, the first storage device associated with the first data resiliency; monitoring vectors associated with performance of the storage devices; determining, based on the monitoring, that a particular vector fails to meet an associated performance criteria for the first data resiliency of the first data, and in response: analyzing characteristics of each of the storage devices, including a resiliency of each of the storage devices; identifying, based on the characteristics of each of the storage devices, a second storage device of the storage devices for migration of the first data such that the first resiliency of the first data is maintained; and migrating the first data from the first storage device to the second storage device.

20 Claims, 4 Drawing Sheets

MIGRATION OF DATA TO MAINTAIN DATA RESILIENCY

BACKGROUND

Field of the Disclosure

The disclosure relates generally to an information handling system, and in particular, migration of data to maintain data resiliency.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of migration of data to maintain data resiliency, including identifying a computing environment including a plurality of storage devices, each storage device associated with a particular data resiliency; receiving user-input indicating a first data resiliency of first data; storing the first data at a first storage device of the plurality of storage devices, the first storage device associated with the first data resiliency; monitoring vectors associated with performance of the plurality of storage devices; determining, based on the monitoring, that a particular vector of the vectors fails to meet an associated performance criteria for the first data resiliency of the first data, and in response: analyzing characteristics of each of the storage devices, including a resiliency of each of the storage devices; identifying, based on the characteristics of each of the storage devices, a second storage device of the plurality of storage devices for migration of the first data such that the first resiliency of the first data is maintained; and migrating the first data from the first storage device to the second storage device.

Other embodiments of these aspects include corresponding systems, apparatus, and computer programs, configured to perform the actions of the methods, encoded on computer storage devices.

These and other embodiments may each optionally include one or more of the following features. For instance, the first storage device is a hyper-converged infrastructure (HCI) storage device. Receiving user-input indicating a change in resiliency of the first data from the first data resiliency to a second data resiliency, and in response: identifying, based on the characteristics of each of the storage devices, a third storage device of the plurality of storage devices for migration of the first data that is associated with the second data resiliency; and migrating the first data from the first storage device to the third storage device. Receiving user-input indicating a change in a connectivity protocol of the first data from a first protocol to a second protocol, and in response: identifying, based on the characteristics of each of the storage devices, a fourth storage device of the plurality of storage devices for migration of the first data that is associated with the second protocol; and migrating the first data from the first storage device to the fourth storage device. Monitoring the vectors further comprises determining a response time for accessing the first data, and wherein determining that the particular vector fails to meet the associated performance criteria further comprises determining that the response time for accessing the first data is greater than a threshold. Analyzing characteristics of each of the storage devices further includes analyzing, for each of the storage devices, a front-end load, a back-end load, a storage capacity, and a network load. Determining that the particular vector fails to meet the associated performance criteria further comprises determining that the failing of the particular vector to meet the associated performance criteria is on-going and non-transient.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
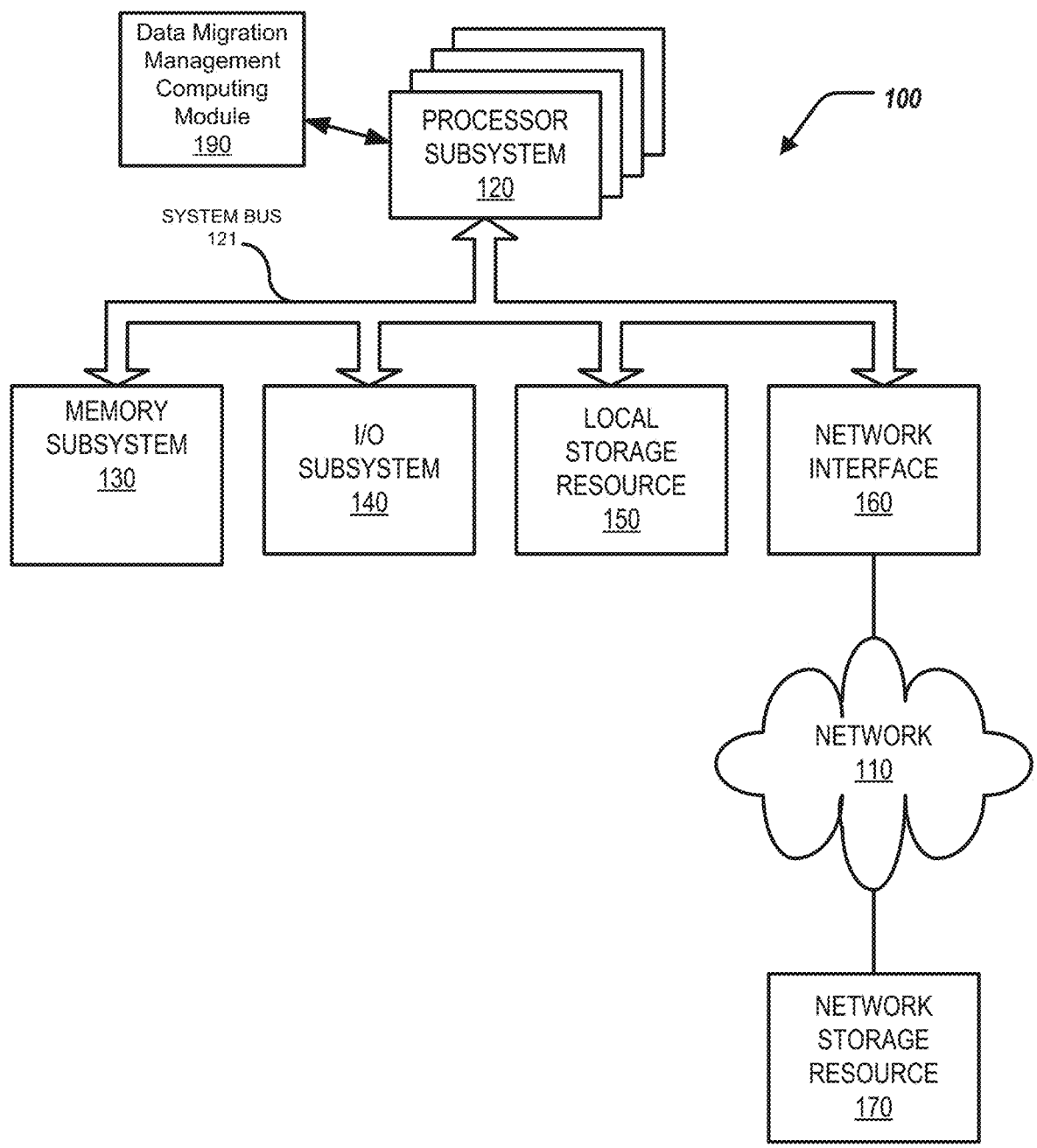
FIG. 1 is a block diagram of selected elements of an embodiment of an information handling system.

This disclosure discusses methods and systems for migration of data to maintain data resiliency. In short, a cloud computing environment can include multiple servers, switches, and storage devices. The storage devices can be divided into storage classes based on resiliency, performance, cost, capacity, ease-of-growth, and other vectors. Seamless migration between the storage devices (including HCI and traditional storage) can be provided.

Specifically, this disclosure discusses a system and a method for migration of data to maintain data resiliency, including identifying a computing environment including a plurality of storage devices, each storage device associated with a particular data resiliency; receiving user-input indicating a first data resiliency of first data; storing the first data at a first storage device of the plurality of storage devices, the first storage device associated with the first data resiliency; monitoring vectors associated with performance of the plurality of storage devices; determining, based on the monitoring, that a particular vector of the vectors fails to meet an associated performance criteria for the first data resiliency of the first data, and in response: analyzing characteristics of each of the storage devices, including a resiliency of each of the storage devices; identifying, based on the characteristics of each of the storage devices, a second storage device of the plurality of storage devices for migration of the first data such that the first resiliency of the first data is maintained; and migrating the first data from the first storage device to the second storage device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a data migration management computing module 190. The processor subsystem 120 can include the data migration management computing module 190, or be executed by the processor subsystem 120.

In short, a cloud computing environment can include multiple servers, switches, and storage devices. The storage devices can be divided into storage classes based on resiliency, performance, cost, capacity, ease-of-growth, and other vectors. Seamless migration between the storage devices (including HCI and traditional storage) can be provided.

Figure 2:
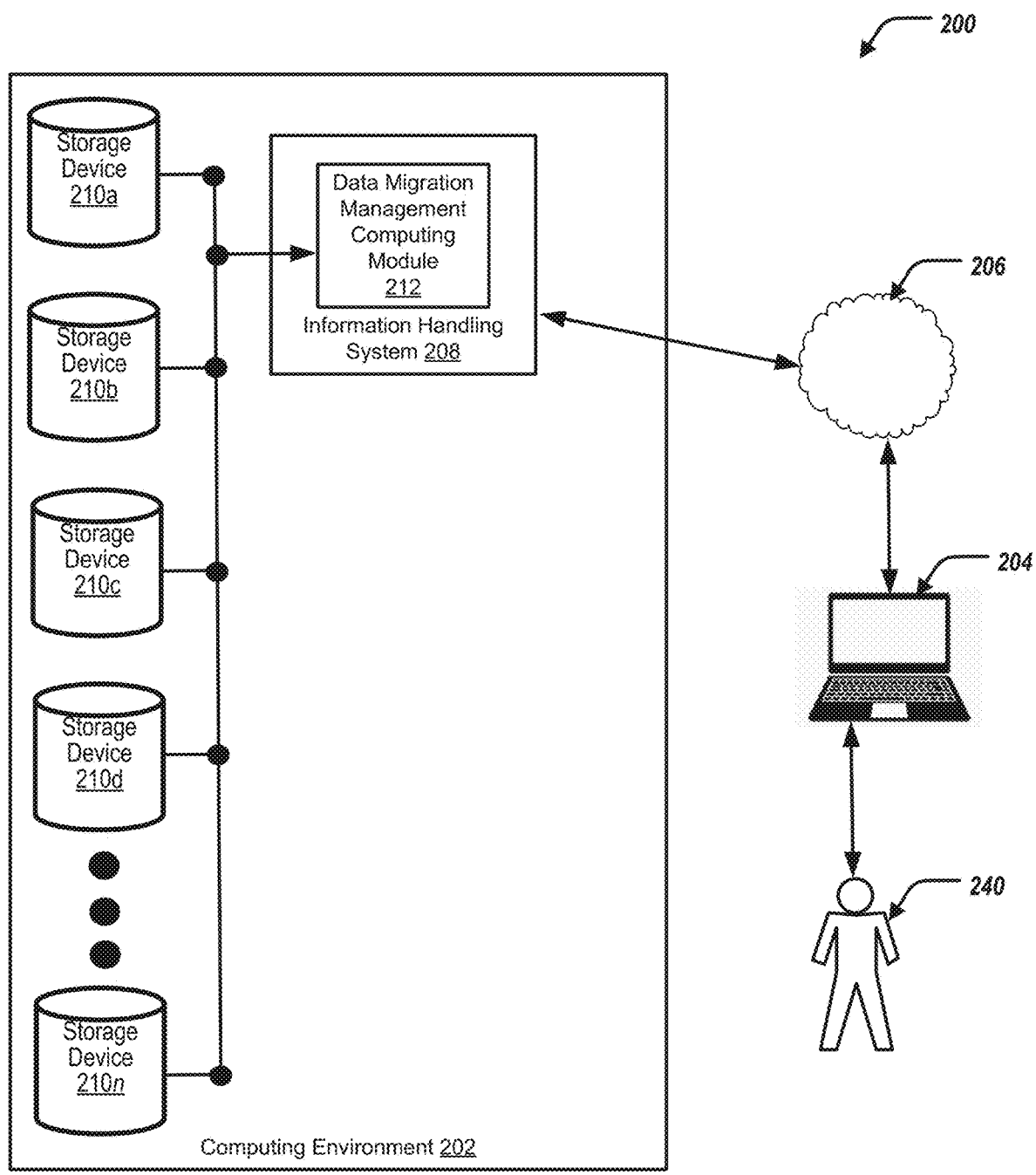
FIG. 2 illustrates a block diagram of a computing environment for managing migration of data.

Turning to FIG. 2, FIG. 2 illustrates an environment 200 including a computing environment 202, an information handling system 204, and a network 206. The computing environment 202 can include an information handling system 208 and storage devices 210a, 210b, 210c, 210d, ..., 210n (collectively referred to as storage devices 210). The information handling system 210 can include a data migration management computing module 212. In some examples, the information handling system 204 and the information handling system 208 is similar to, or includes, the information handling system 100 of FIG. 1. In some examples, the data migration management computing module 212 is the same, or substantially the same, as the data migration management computing module 190 of FIG. 1.

The information handling system 204 can be in communication with the information handling system 208 through the network 206. The network 206 can include any type of network, including an internal network or external network. The information handling system 208, and in particular, the data migration management computing module 212, is in communication with the storage devices 210.

In some examples, the storage devices 210 are associated with a particular data resiliency. In some examples, a first subset of the storage devices 210 are associated with a first data resiliency and a second subset of the storage devices 210 (differing from the first subset of the storage devices 210) are associated with a second data resiliency (differing from the first data resiliency). In some examples, each of the storage devices 210 is associated with a different data resiliency. In some examples, the resiliency of the storage devices 210 can indicate, for a particular storage device 210, security of data stored at the particular storage device 210, and continuity of availability of the data in view of unexpected disruption to the data (e.g., minutes of downtime of the data). In some examples, the resiliency of the storage devices 210 can indicate an ability to provide and maintain an acceptable level of service of access to the data stored by the storage devices 210 in view of faults and challenges to the normal operation of the storage devices 210. In some examples, resiliency of the data and the storage devices 210 can be quantified as the amount of uptime of the data (or conversely, amount of downtime of the data). For example, the resiliency of the data that is stored by the storage devices 210 can be quantified by an amount of "nines" of uptime—5 nines of uptime is 99.999% of uptime.

Figure 3:
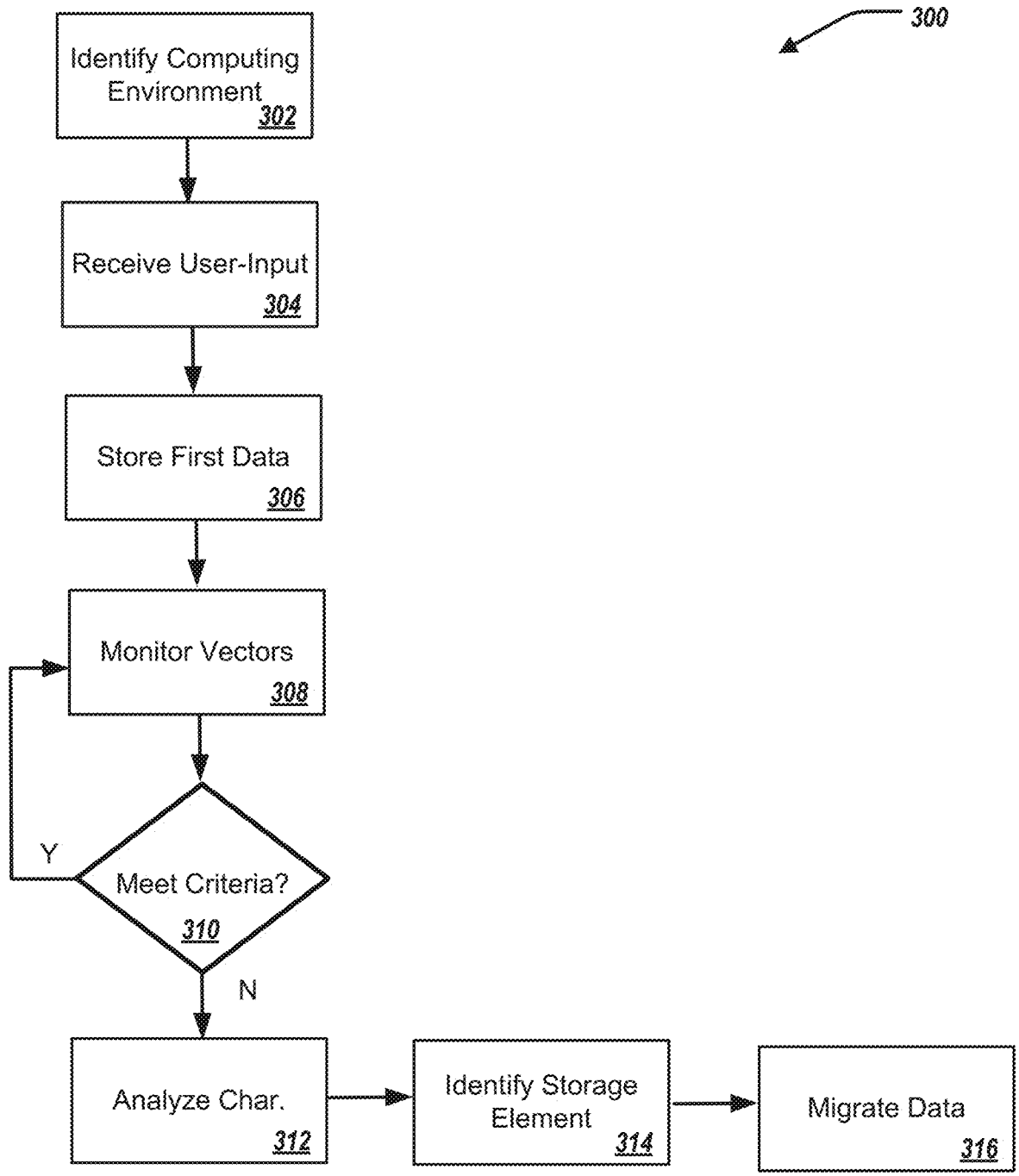
FIGS. 3 and 4 illustrate respective methods for managing migration of data.

FIG. 3 illustrates a flowchart depicting selected elements of an embodiment of a method 300 for managing migration of data. The method 300 may be performed by the information handling system 100, the information handling system 208, and/or the data migration management computing module 212, and with reference to FIGS. 1-2. It is noted that certain operations described in method 300 may be optional or may be rearranged in different embodiments.

The data migration management computing module 212 can identify the storage devices 210, at 302.

The data migration management computing module 212 can receive user-input, at 304. Specifically, a user 240 can provide input to the information handling system 204 (e.g., by interacting with input devices of the information handling system 204). The information handling system 204 can communicate the user-input over the network 206 to the information handling system 208, and specifically, the data migration management computing module 212. In some examples, the user-input can indicate a first data resiliency of first data.

The data migration management computing module 212 can store the first data at a first storage device 210*a*, at 306. The first storage device 210*a* is associated with a first data resiliency. In some examples, the first storage device 210*a* is a hyper-converged infrastructure (HCI) storage device.

The data migration management computing module 212 monitors vectors associated with performance of the storage devices 210, at 308. That is, the data migration management computing module 212 monitors vectors associated with the performance of storing data at the storage devices 210, including storing of the first data at the first storage device 210*a*.

The vectors can be related to performance of the storage devices 210. For example, the vectors can be related to congestion of the storage devices 210, such as front-end input/output density, back-end maximum capacity. For example, the vectors can be related to network congestion (along the storage devices 210 and/or the network 206), such as Ethernet/FC congestion and/or storage area network (SAN) response time (RT). For example, the vectors can be related to failure percentage of the storage devices 210 (number of failed drives of each of the storage devices 210 when the storage devices 210 contain multiple drives). For example, the vectors can be related to a number of resets of the storage devices 210 (over a time period).

In some examples, monitoring the vectors associated with the performance of the storage devices 210 can include determining a response time (RT) for accessing the first data. For example, accessing the first data stored by the first storage device 210*a*.

The data migration management computing module 212 can compare one or more of the vectors with an associated performance criteria for the first data resiliency of the first data, at 310. That is, for a particular vector, the data migration management computing module 212 can determine whether the performance criteria associated with the particular vector and for the first data resiliency, is being satisfied. The data migration management computing module 212 can identify "out-of-compliance" vectors and determine whether the vectors that are "out-of-compliance" are on-going and not transient.

In some examples, the data migration management computing module 212 can determine that a particular vector of the vectors meets an associated performance criteria for the first data resiliency of the first data. In response to determining that the particular vector of the vectors meets an associated performance criteria for the first data resiliency of the first data, the method 300 returns to step 308. That is, the data migration management computing module 212 can compare a further vector with an associated performance criteria for the first data resiliency of the first data, at 308. For example, the data migration management computing module 212 determines that for the vector of response time (RT), that the response time of 0.9 milliseconds for accessing the first data at the first storage device 210*a* is less than a threshold of 1 millisecond, and thus, meets the associated performance criteria. For example, the data migration management computing module 212 determines that for the vector of failed drives, that the percentage of failed drives of the first storage device 210*a* is below a threshold, and thus, meets the associated performance criteria. For example, the data migration management computing module 212 determines that for the vector of number of resets, that the number of resets of the first storage device 210*a* over a time period is below a threshold, and thus, meets the associated performance criteria.

In some examples, the data migration management computing module 212 can determine that a particular vector of the vectors fails to meet an associated performance criteria for the first data resiliency of the first data (at 310). In some examples, the data migration management computing module 212 determines that the response time (RT) for accessing the first data is greater than a threshold. For example, the data migration management computing module 212 determines that for the vector of response time, that the response time of 2 milliseconds for accessing the first data at the first storage device 210*a* is greater than a threshold of 1 millisecond, and thus, does not meet the associated performance criteria. For example, the data migration management computing module 212 determines that for the vector of failed drives, that the percentage of failed drives of the first storage device 210*a* is greater a threshold, and thus, does not meet the associated performance criteria. For example, the data migration management computing module 212 determines that for the vector of number of resets, that the number of resets of the first storage device 210*a* over a time period is greater than a threshold, and thus, does not meet the associated performance criteria. In some examples, as greater quantities of data are stored at the first storage device 210*a*, degradation of the response time of access to the first data at the first storage device 210*a* can increase (over a desired threshold).

In some examples, the data migration management computing module 212 determines that the failing of the particular vector to meet the associated performance criteria is on-going and non-transient. For example, the RT for accessing the first data is greater than the threshold is on-going and non-transient.

In response to determining that the particular vector of the vectors fails to meet an associated performance criteria for the first data resiliency of the first data (at 310), the data migration management computing module 212 analyzes characteristics of each of the storage devices 210, at 312. The data migration management computing module 212 can analyze, for each of the storage devices 210, a resiliency of the storage devices 210. That is, the data migration management computing module 212 can determine an uptime of each of the storage devices 210. In some examples, the data migration management computing module 212 can analyze, for each of the storage devices 210, one or more of a front-end load, a back-end load, a storage capacity, and a network load.

The data migration management computing module 212 can identify, based on the characteristics of each of the storage devices 210, a second storage device 210*b* for migration of the first data, at 314. That is, the data migration management computing module 212 can identify the second storage element 210*b* that is associated with the first resiliency such that the first resiliency of the first data is maintained. That is, based on the characteristics of each of the storage devices 210, the data migration management computing module 212 identifies the second storage device 210*b* as being associated with the first resiliency. The second storage device 210*b* can be identified as the "target" storage device for migration of the first data.

The data migration management computing module 212 migrates the first data from the first storage device 210*a* to the second storage device 210*b*, at 316.

Figure 4:
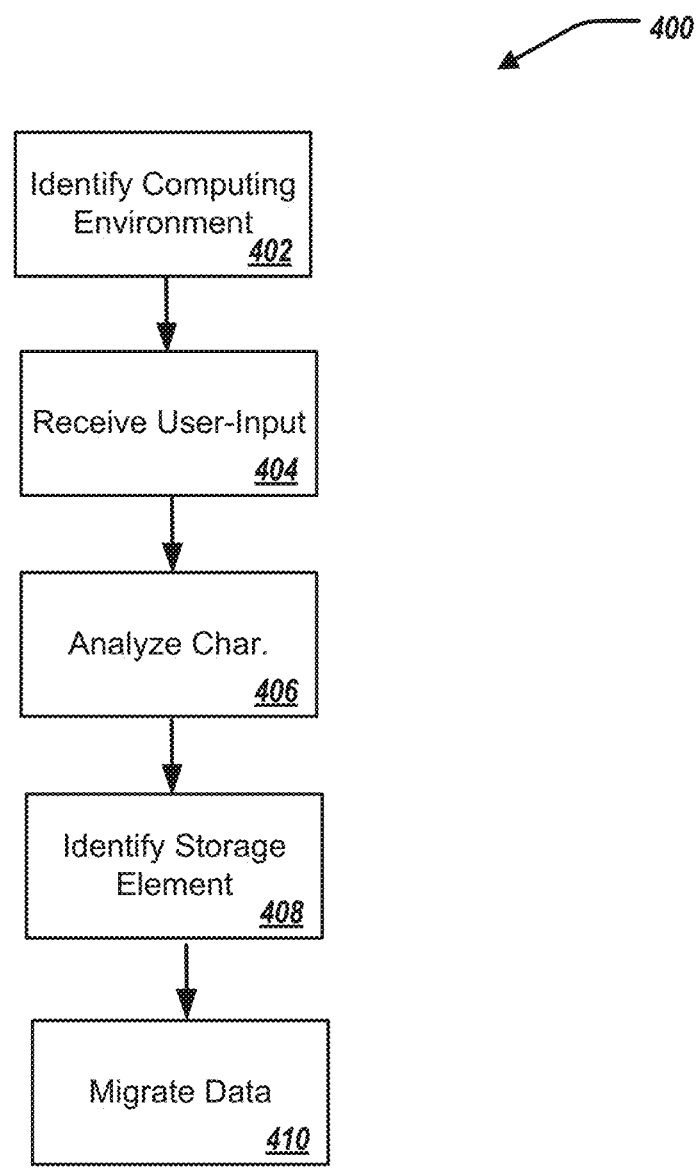

FIG. 4 illustrates a flowchart depicting selected elements of an embodiment of a method 400 for managing migration of data. The method 400 may be performed by the information handling system 100, the information handling system 208, and/or the data migration management computing module 212, and with reference to FIGS. 1-2. It is noted that certain operations described in method 400 may be optional or may be rearranged in different embodiments.

The data migration management computing module 212 can identify the storage devices 210, at 402.

The data migration management computing module 212 can receive user-input, at 404. Specifically, the user 240 can provide input to the information handling system 204 (e.g., by interacting with input devices of the information handling system 204). The information handling system 204 can communicate the user-input over the network 206 to the information handling system 208, and the data migration management computing module 212.

In some examples, the user-input can indicate a change in resiliency of the first data from the first data resiliency to a second data resiliency. That is, the user-input can indicate a change in resiliency of the first data that is previously stored by one or more of the storage devices 210 (e.g., change in resiliency tier). For example, the user 240 can indicate an increase (or decrease) in resiliency of the first data to be stored at storage devices 210 from the first data resiliency to a second data resiliency (with the second data resiliency being greater or less resilient than the first data resiliency). For example, the user 240 can indicate an increase in resiliency of the first data to be stored at storage devices 210 from 4 nines of uptime (99.99% of uptime) to 6 nines of uptime (99.9999% of uptime). For example, the user 240 can indicate a decrease in resiliency of the first data to be stored at storage devices 210 from 6 nines of uptime (99.9999% of uptime) to 4 nines of uptime (99.99% of uptime). In some examples, the first data is previously stored at one or more of the storage devices 210, and the user 240 provides user input to update the resiliency of the first data previously stored at the storage device 210. In some examples, the user 240 can update the resiliency of the first data (resiliency associated with the first data) based on storage cost and/or performance requirements.

In some examples, the user-input can indicate a change in connectivity protocol associated with the first data from a first protocol to a second protocol. The change in connectivity protocol can be associated with the storage devices 210 and/or the data migration management computing module 212. For example, the change in connectivity can be from a first connectivity protocol of small computer system interface (SCSI) to a second connectivity protocol of non-volatile memory express transfer control protocol (NVMeTCP).

The data migration management computing module 212 analyzes characteristics of each of the storage devices 210, at 406. The data migration management computing module 212 can analyze, for each of the storage devices 210, a resiliency of the storage devices 210. That is, the data migration management computing module 212 can determine an uptime of each of the storage devices. In some examples, the data migration management computing module 212 can analyze, for each of the storage devices 210, one or more of a front-end load, a back-end load, a storage capacity, and a network load.

The data migration management computing module 212 can identify, based on the characteristics of each of the storage devices 210, a third storage device 210c for migration of the first data, at 408.

In some examples, the data migration management computing module 212 can identify the third storage device 210c based on the user-input indicating a change in resiliency of the first data from the first data resiliency to a second data resiliency. The data migration management computing module 212 identifies the third storage device 210c that is associated with the second resiliency. That is, based on the characteristics of each of the storage devices 210, the data migration management computing module 212 identifies the third storage device 210c as being associated with the second resiliency. The third storage device 210c can be identified as the "target" storage device for migration of the first data.

In some examples, the data migration management computing module 212 can identify the third storage device 210c based on the user-input indicating a change in connectivity protocol associated with the first data from a first protocol to a second protocol. The data migration management computing module 212 can identify the third storage device 210c that is associated with the second connectivity protocol. That is, based on the characteristics of each of the storage devices 210, the data migration management computing module 212 identifies the third storage device 210c as being associated with the second connectivity protocol. The third storage device 210c can be identified as the "target" storage device for migration of the first data.

The data migration management computing module 212 migrates the first data from the first storage device 210a to the third storage device 210c, at 410.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of migration of data to maintain data resiliency, the method comprising:
   identifying a computing environment including a plurality of storage devices, each storage device associated with a particular data resiliency;
   receiving user-input indicating a first data resiliency of first data;
   storing the first data at a first storage device of the plurality of storage devices, the first storage device associated with the first data resiliency;
   monitoring vectors associated with performance of the plurality of storage devices;
   determining, based on the monitoring, that a particular vector of the vectors meets an associated performance criteria for the first data resiliency of the first data, including determining that a percentage of failed drives of the first storage device is below a threshold;
   in response to determining that the percentage of failed drives of the first storage device is below the threshold, determining, based on the monitoring, that an additional vector of the vectors fails to meet an associated additional performance criteria for the first data resiliency of the first data, including determining that a number of resets of the first storage device over a time period is above a threshold;
   in response to determining that the number of resets of the first storage device over the time period is above the threshold:
      analyzing characteristics of each of the storage devices, including a resiliency of each of the storage devices;
      identifying, based on the characteristics of each of the storage devices, a second storage device of the plurality of storage devices for migration of the first data such that the first resiliency of the first data is maintained; and
      migrating the first data from the first storage device to the second storage device.

2. The method of claim 1, wherein the first storage device is a hyper-converged infrastructure (HCI) storage device.

3. The method of claim 1, further comprising:
   receiving user-input indicating a change in resiliency of the first data from the first data resiliency to a second data resiliency, and in response:
   identifying, based on the characteristics of each of the storage devices, a third storage device of the plurality of storage devices for migration of the first data that is associated with the second data resiliency; and
   migrating the first data from the first storage device to the third storage device.

4. The method of claim 1, further comprising:
   receiving user-input indicating a change in a connectivity protocol of the first data from a first protocol to a second protocol, and in response:
   identifying, based on the characteristics of each of the storage devices, a fourth storage device of the plurality of storage devices for migration of the first data that is associated with the second protocol; and
   migrating the first data from the first storage device to the fourth storage device.

5. The method of claim 1,
   wherein monitoring the vectors further comprises determining a response time for accessing the first data, and
   wherein determining that the particular vector fails to meet the associated performance criteria further comprises determining that the response time for accessing the first data is greater than a threshold.

6. The method of claim 1, wherein analyzing characteristics of each of the storage devices further includes analyzing, for each of the storage devices, a front-end load, a back-end load, a storage capacity, and a network load.

7. The method of claim 1, wherein determining that the particular vector fails to meet the associated performance criteria further comprises determining that the failing of the particular vector to meet the associated performance criteria is on-going and non-transient.

8. An information handling system comprising a processor having access to memory media storing instructions executable by the processor to perform operations, comprising:
   identifying a computing environment including a plurality of storage devices, each storage device associated with a particular data resiliency;
   receiving user-input indicating a first data resiliency of first data;
   storing the first data at a first storage device of the plurality of storage devices, the first storage device associated with the first data resiliency;
   monitoring vectors associated with performance of the plurality of storage devices;
   determining, based on the monitoring, that a particular vector of the vectors meets an associated performance criteria for the first data resiliency of the first data, including determining that a percentage of failed drives of the first storage device is below a threshold;
   in response to determining that the percentage of failed drives of the first storage device is below the threshold, determining, based on the monitoring, that an additional vector of the vectors fails to meet an associated additional performance criteria for the first data resiliency of the first data, including determining that a number of resets of the first storage device over a time period is above a threshold;
   in response to determining that the number of resets of the first storage device over the time period is above the threshold:
   analyzing characteristics of each of the storage devices, including a resiliency of each of the storage devices;
   identifying, based on the characteristics of each of the storage devices, a second storage device of the plurality of storage devices for migration of the first data such that the first resiliency of the first data is maintained; and
   migrating the first data from the first storage device to the second storage device.

9. The information handling system of claim 8, wherein the first storage device is a hyper-converged infrastructure (HCI) storage device.

10. The information handling system of claim 8, the operations further comprising:
    receiving user-input indicating a change in resiliency of the first data from the first data resiliency to a second data resiliency, and in response:
    identifying, based on the characteristics of each of the storage devices, a third storage device of the plurality of storage devices for migration of the first data that is associated with the second data resiliency; and
    migrating the first data from the first storage device to the third storage device.

11. The information handling system of claim 8, the operations further comprising:
    receiving user-input indicating a change in a connectivity protocol of the first data from a first protocol to a second protocol, and in response:

identifying, based on the characteristics of each of the storage devices, a fourth storage device of the plurality of storage devices for migration of the first data that is associated with the second protocol; and
migrating the first data from the first storage device to the fourth storage device.

12. The information handling system of claim 8,
wherein monitoring the vectors further comprises determining a response time for accessing the first data, and
wherein determining that the particular vector fails to meet the associated performance criteria further comprises determining that the response time for accessing the first data is greater than a threshold.

13. The information handling system of claim 8, wherein analyzing characteristics of each of the storage devices further includes analyzing, for each of the storage devices, a front-end load, a back-end load, a storage capacity, and a network load.

14. The information handling system of claim 8, wherein determining that the particular vector fails to meet the associated performance criteria further comprises determining that the failing of the particular vector to meet the associated performance criteria is on-going and non-transient.

15. A non-transitory computer-readable medium storing software comprising instructions executable by one or more computers which, upon such execution, cause the one or more computers to perform operations comprising:
identifying a computing environment including a plurality of storage devices, each storage device associated with a particular data resiliency;
receiving user-input indicating a first data resiliency of first data;
storing the first data at a first storage device of the plurality of storage devices, the first storage device associated with the first data resiliency;
monitoring vectors associated with performance of the plurality of storage devices;
determining, based on the monitoring, that a particular vector of the vectors meets an associated performance criteria for the first data resiliency of the first data, including determining that a percentage of failed drives of the first storage device is below a threshold;
in response to determining that the percentage of failed drives of the first storage device is below the threshold, determining, based on the monitoring, that an additional vector of the vectors fails to meet an associated additional performance criteria for the first data resiliency of the first data, including determining that a number of resets of the first storage device over a time period is above a threshold;

in response to determining that the number of resets of the first storage device over the time period is above the threshold:
analyzing characteristics of each of the storage devices, including a resiliency of each of the storage devices;
identifying, based on the characteristics of each of the storage devices, a second storage device of the plurality of storage devices for migration of the first data such that the first resiliency of the first data is maintained; and
migrating the first data from the first storage device to the second storage device.

16. The non-transitory computer-readable medium of claim 15, wherein the first storage device is a hyperconverged infrastructure (HCI) storage device.

17. The non-transitory computer-readable medium of claim 15, the operations further comprising:
receiving user-input indicating a change in resiliency of the first data from the first data resiliency to a second data resiliency, and in response:
identifying, based on the characteristics of each of the storage devices, a third storage device of the plurality of storage devices for migration of the first data that is associated with the second data resiliency; and
migrating the first data from the first storage device to the third storage device.

18. The non-transitory computer-readable medium of claim 15, the operations further comprising:
receiving user-input indicating a change in a connectivity protocol of the first data from a first protocol to a second protocol, and in response:
identifying, based on the characteristics of each of the storage devices, a fourth storage device of the plurality of storage devices for migration of the first data that is associated with the second protocol; and
migrating the first data from the first storage device to the fourth storage device.

19. The non-transitory computer-readable medium of claim 15,
wherein monitoring the vectors further comprises determining a response time for accessing the first data, and
wherein determining that the particular vector fails to meet the associated performance criteria further comprises determining that the response time for accessing the first data is greater than a threshold.

20. The non-transitory computer-readable medium of claim 15, wherein analyzing characteristics of each of the storage devices further includes analyzing, for each of the storage devices, a front-end load, a back-end load, a storage capacity, and a network load.

* * * * *